United States Patent
Orris, Jr. et al.

(10) Patent No.: US 10,402,666 B2
(45) Date of Patent: Sep. 3, 2019

(54) VEHICLE MONITORING OF INFRASTRUCTURE LIGHTING

(71) Applicant: Ford Global Technologies, LLC, Dearborn, MI (US)

(72) Inventors: Stephen Jay Orris, Jr., New Boston, MI (US); David A. Herman, Southfield, MI (US); Nicholas Alexander Scheufler, Flat Rock, MI (US); Nunzio DeCia, Northville, MI (US); David Michael Herman, Southfield, MI (US); David Joseph Orris, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/845,270

(22) Filed: Dec. 18, 2017

(65) Prior Publication Data

US 2019/0188503 A1 Jun. 20, 2019

(51) Int. Cl.

| | |
|---|---|
| G06K 9/00 | (2006.01) |
| B60R 11/04 | (2006.01) |
| G06T 7/73 | (2017.01) |
| G08G 1/0967 | (2006.01) |
| G08G 1/097 | (2006.01) |

(52) U.S. Cl.
CPC .......... *G06K 9/00825* (2013.01); *B60R 11/04* (2013.01); *G06T 7/73* (2017.01); *G08G 1/097* (2013.01); *G08G 1/096766* (2013.01); *G06T 2207/30252* (2013.01)

(58) Field of Classification Search
CPC ............... G06K 9/00825; G08G 1/097; G08G 1/096766; B60R 11/04; G06T 7/73; G06T 2207/30252
See application file for complete search history.

(56) References Cited

U.S. PATENT DOCUMENTS

| | | | |
|---|---|---|---|
| 8,031,062 B2 | 10/2011 | Smith | |
| 9,469,242 B2 | 10/2016 | Imaeda et al. | |
| 9,646,499 B1* | 5/2017 | Finlow-Bates | ......... B60R 11/04 |
| 2003/0167123 A1 | 9/2003 | Nakazawa et al. | |

(Continued)

FOREIGN PATENT DOCUMENTS

| | | |
|---|---|---|
| KR | 20160047724 A | 5/1916 |
| WO | WO 2017034562 A1 | 3/1917 |

OTHER PUBLICATIONS

Nathaniel Fairfield and Chris Urmson, *Traffic Light Mapping and Detection*, 6 pages.

*Primary Examiner* — Joseph Suh
(74) *Attorney, Agent, or Firm* — Frank Lollo; Neal, Gerber & Eisenberg LLP; James P. Muraff (57) ABSTRACT

A method and apparatus for vehicle monitoring of infrastructure lighting, an example of which includes a vehicle having a camera, an inter-vehicle communication module and a controller. The controller is to identify a stationary infrastructure object within an image captured by the camera and identify, in response to determining that the stationary infrastructure object includes a lamp, whether the lamp is inoperable. The controller also is to send, via vehicle-to-infrastructure communication utilizing the inter-vehicle communication module, an alert to an infrastructure communication node indicating that the lamp is inoperable.

20 Claims, 7 Drawing Sheets

(56) References Cited

U.S. PATENT DOCUMENTS

| | | | |
|---|---|---|---|
| 2009/0240554 A1* | 9/2009 | Oswald | G06F 17/30241 |
| | | | 705/7.11 |
| 2016/0004300 A1* | 1/2016 | Baic | G06F 3/011 |
| | | | 345/419 |
| 2016/0342701 A1* | 11/2016 | Sung | H05B 37/0272 |
| 2017/0011271 A1* | 1/2017 | Hishinuma | B60W 40/00 |
| 2017/0280539 A1* | 9/2017 | Bhageria | H05B 37/03 |
| 2018/0041690 A1* | 2/2018 | Miyazawa | G02B 7/28 |
| 2018/0053414 A1* | 2/2018 | Qin | G08G 1/0112 |
| 2018/0122229 A1* | 5/2018 | Mubarek | G08B 21/18 |

* cited by examiner

VEHICLE MONITORING OF
INFRASTRUCTURE LIGHTING

TECHNICAL FIELD

The present disclosure generally relates to infrastructure and, more specifically, to vehicle monitoring of infrastructure lighting.

BACKGROUND

Typically, an infrastructure system utilizes lighting to facilitate vehicles in travelling through the infrastructure system. For instance, streetlamps are oftentimes located along a side of a road to facilitate a vehicle in traveling along the road when it is dark. Traffic lights are generally located at intersections to manage traffic through the intersections. Further, signs (e.g., traffic signs, commercial signs) are located along a side of a road to facilitate an operator of a vehicle in navigating through an infrastructure system. Additionally, vehicles typically include exterior lamps to facilitate the vehicle in traveling along a road when it is dark and/or to warn other vehicles that it is braking and/or turning.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle monitoring of infrastructure lighting. An example disclosed vehicle includes a camera, an inter-vehicle communication module and a controller. The controller is to identify a stationary infrastructure object within an image captured by the camera and identify, in response to determining that the stationary infrastructure object includes a lamp, whether the lamp is inoperable. The controller also is to send, via vehicle-to-infrastructure communication utilizing the inter-vehicle communication module, an alert to an infrastructure communication node indicating that the lamp is inoperable.

Some examples further include a proximity sensor to further detect a presence of the stationary infrastructure object. In some examples, to identify the stationary infrastructure object and operability of the lamp, the controller utilizes machine learning to perform image recognition.

In some examples, the controller monitors a light emission of the lamp to determine whether the lamp is inoperable. Some such examples further include a light sensor configured to collect light emission measurements to enable the controller to monitor the light emission of the lamp. In some such examples, to monitor the light emission of the lamp, the controller utilizes light frequency filtering to process a light profile of the lamp. In some such examples, the controller determines that the lamp is inoperable in response to determining, based upon the light emission of the lamp, that one or more LEDs of the lamp is inoperable.

Some examples further include a second communication module configured to send the alert to a server via a cellular network and a GPS receiver configured to identify a vehicle location. In such examples, the controller includes the vehicle location, at which the camera captured the image that included the stationary infrastructure object, in the alert to facilitate identification of a location of the lamp that is inoperable.

In some examples, the controller identifies that the stationary infrastructure object is a lamppost. The lamp of the lamppost is a first streetlamp configured to illuminate a portion of a road. Some such examples further include a light sensor to monitor an ambient light. In such examples, the controller is configured to identify an operability of the first streetlamp in response to the light sensor detecting that the ambient light is below an ambient light threshold. In some such examples, upon the controller identifying that the lamppost includes the first streetlamp and a second streetlamp, the controller determines an operability of the first streetlamp by comparing light emissions of the first streetlamp and the second streetlamp. In some such examples, the controller is configured to identify a pattern of lampposts along the road based upon a plurality images captured by the camera, determine a pattern of illumination corresponding to the pattern of lampposts, and identify that the first streetlamp of the lamppost is inoperable in response to determining an illumination measurement of the lamppost does not correspond to the pattern of illumination.

In some examples, the controller identifies that the stationary infrastructure object is a first traffic light that includes traffic lamps. In such examples, each of the traffic lamps includes a first lamp for instructing traffic to proceed, a second lamp for instructing the traffic to yield, and a third lamp for instructing the traffic to stop. In some such examples, upon the controller identifying that an intersection includes the first traffic light and a second traffic light, the controller determines an operability of one or more of the traffic lamps of the first traffic light by comparing light emissions of the first traffic light and the second traffic light. In some such examples, the controller is configured to retrieve an illumination pattern of the traffic lamps and identify one of the traffic lamps as inoperable in response to determining that a measured illumination sequence of the traffic lamps does not correspond with the illumination pattern.

In some examples, the controller identifies that the stationary infrastructure object is a commercial sign.

An example disclosed method includes identifying, via a processor, an infrastructure object within an image captured by a camera of a vehicle. The example disclosed method also includes determining whether the infrastructure object includes a lamp and identifying, in response to determining the infrastructure object includes the lamp, whether the lamp is inoperable. The example disclosed vehicle includes sending, via vehicle-to-infrastructure communication utilizing an inter-vehicle communication module of the vehicle, an alert to an infrastructure communication node indicating that the lamp is inoperable.

Some examples further include identifying a pattern of lampposts along a road based upon a plurality of images captured by the camera In such examples, one of the lampposts is the infrastructure object. Such examples further include determining a pattern of illumination corresponding to the pattern of the lampposts and identifying that the lamp of the infrastructure object is inoperable in response to determining that an illumination measurement for the infrastructure object does not correspond to the pattern of illumination.

Some examples further include identifying, based upon the image captured by the camera, an intersection that includes a first traffic light and a second traffic light. In such examples, the first traffic light is the infrastructure object.

Such examples further include determining an operability of the lamp of the first traffic light by comparing light emissions of the first traffic light and the second traffic light.

Some examples further include identifying that the infrastructure object is a traffic light, retrieving an illumination pattern of traffic lamps of the traffic light, and identifying that one of the traffic lamps is inoperable in response to determining that a measured illumination sequence of the traffic lamps does not correspond with the illumination pattern.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, an infrastructure system utilizes lighting to facilitate vehicles in travelling through the infrastructure system. For instance, streetlamps are oftentimes located along a side of a road to facilitate a vehicle in traveling along the road when it is dark. Traffic lights are generally located at intersections to manage traffic through the intersections. Further, signs (e.g., traffic signs, commercial signs) are located along a side of a road to facilitate an operator of a vehicle in navigating through an infrastructure system. Additionally, vehicles typically include exterior lamps to facilitate the vehicle in traveling along a road when it is dark and/or to warn other vehicles that it is braking and/or turning. When such lighting is inoperable, a vehicle operator's ability to navigate through an infrastructure system potentially may be hindered.

Examples disclosed herein enable a vehicle to identify when lamps of nearby infrastructure objects (e.g., lampposts, traffic lights, commercial signs, etc.) and/or vehicles are inoperable and send alerts to infrastructure nodes, vehicle communication nodes, and/or remote servers to facilitate subsequent servicing of the inoperable lamps. Example methods and apparatus disclosed herein include a vehicle system that detects when nearby lights are out. The system includes a camera that captures images of nearby objects. The vehicle also may include other sensor(s) (e.g., a radar sensor, an ultrasonic sensor) to further detect a presence of nearby objects. The system utilizes image recognition to analyze the captured images, for example, to detect when a light of a nearby object is inoperable. For example, the system is configured to detect when each of the following nearby lights is out: a light (e.g., a taillight) of another vehicle (e.g., upon identifying that it is dark out), a brake light of another vehicle (e.g., upon identifying that the other vehicle is braking), a streetlight (e.g., upon identifying a streetlight pattern), a traffic light, a light of a commercial sign, etc. For example, if a light of another vehicle is out, the system sends an alert to the other vehicle via vehicle-to-vehicle (V2V) and/or vehicle-to-infrastructure (V2I) communication utilizing an inter-vehicle communication module (e.g., a dedicated short-range communication (DSRC)) module of the vehicle. If a streetlight or a traffic light is out, the system sends an alert to an infrastructure node via V2I communication utilizing the inter-vehicle communication module. If a light of a commercial sign is out, the system sends an alert to a remote server. The system may further use crowd-sourcing to map intersections and/or other features of roads.

Figure 1:
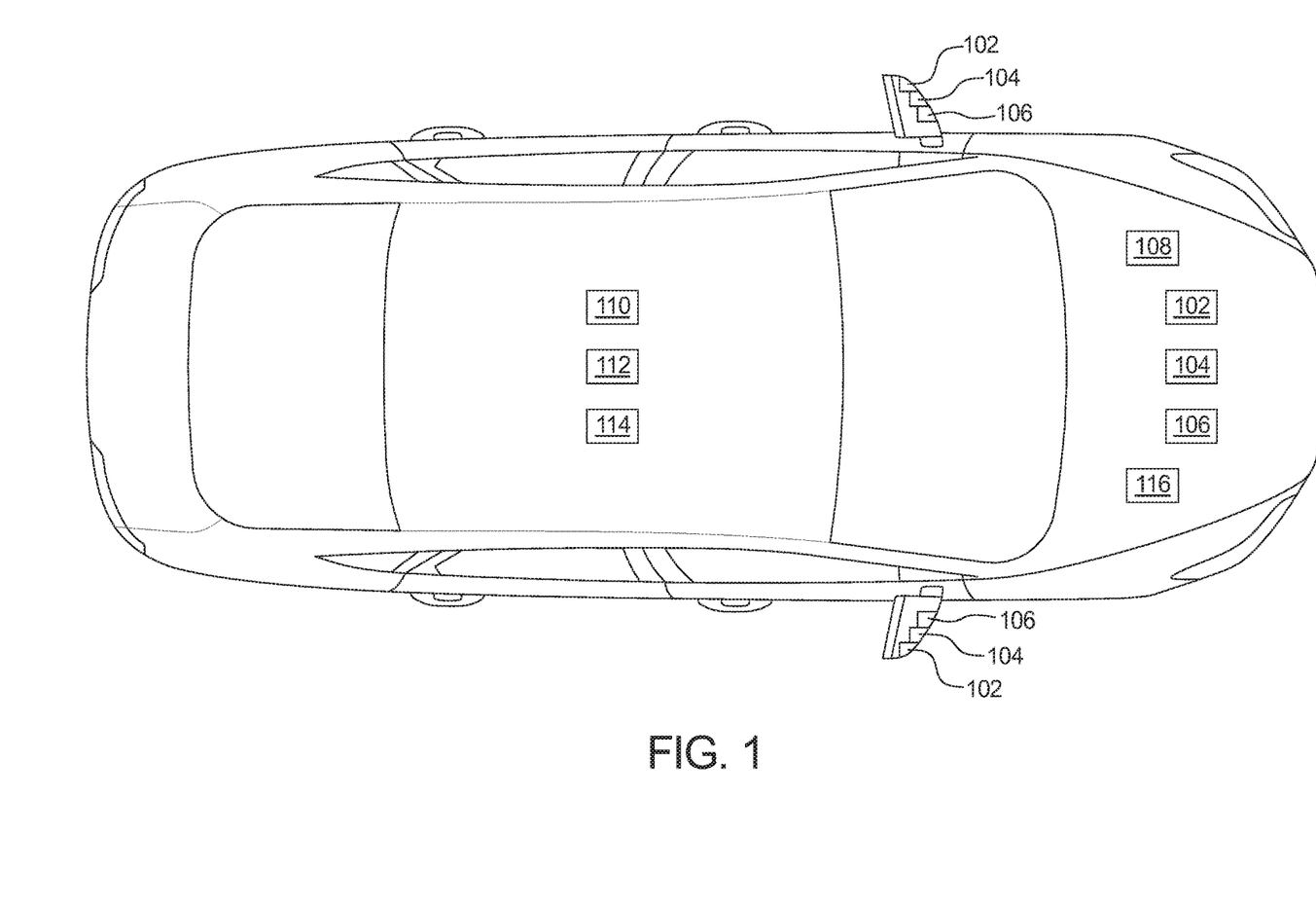
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes one or more cameras 102, one or more light sensors 104, and one or more proximity sensors 106. The cameras 102 are configured to capture image(s) and/or video of a surrounding area of the vehicle 100 that are utilized for image recognition. In some examples, the cameras 102 are configured to measure a luminosity, a brightness, a color, and/or other characteristics of ambient light. For example, the cameras 102 include sensors that detect characteristics of ambient light (e.g., a luminosity, a brightness, a color, and/or other characteristics) around the cameras 102 and/or the vehicle 100. Further, the light sensors 104 are configured to detect characteristics of ambient light (e.g., a luminosity, a brightness, a color, and/or other characteristics) around light sensors 104 and/or the vehicle 100. For example, the light sensors 104 are configured to collect light emission measurements to facilitate monitoring of light emitted near the vehicle 100. The proximity sensors 106 are configured to detect a presence of, a relative location of, and/or a distance to object(s) (e.g., a stationary infrastructure object, another vehicle, etc.) positioned within the surrounding area of the vehicle 100. For example, the proximity sensors 106 include radar sensor(s) that detect and locate an object via radio waves, lidar sensor(s) that detect and locate an object via lasers, ultrasonic sensor(s) that detect and locate an object via ultrasound waves, and/or any other type of sensor that is configured to detect and locate a nearby object.

Further, the vehicle 100 of the illustrated example includes a navigation system 108 and a global positioning system (GPS) receiver 110. For example, the navigation system 108 is an electronic system that facilitates an operator (e.g., a driver) of the vehicle 100 in navigating the vehicle 100. For example, the navigation system 108 presents map(s), provides direction(s), and/or identifies traffic condition(s) and/or obstacle(s) to facilitate the operator in navigating from a current location to a target destination. Further, the GPS receiver 110 receives a signal from a global positioning system to identify the current location of the vehicle 100.

As illustrated in FIG. 1, the vehicle 100 includes a communication module 112 that includes wired or wireless network interfaces to enable communication with external networks. The communication module 112 also includes hardware (e.g., processors, memory, storage, antenna, etc.) and software to control the wired or wireless network interfaces. In the illustrated example, the communication module 112 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols.

The vehicle 100 of the illustrated example also includes a communication module 114. The communication module 114 is an inter-vehicle communication module that includes antenna(s), radio(s) and software to broadcast messages and to establish connections between the vehicle 100 and other vehicle(s) via vehicle-to-vehicle (V2V) communication, infrastructure-based modules via vehicle-to-infrastructure (V2I) communication, and mobile device-based modules via V2X communication. More information on the inter-vehicle communication network and how the network may communicate with vehicle hardware and software is available in the U.S. Department of Transportation's Core June 2011 System Requirements Specification (SyRS) report (available at http://www.its.dot.gov/meetings/pdf/CoreSystem_SE-_SyRS_RevA%20(2011-06-13).pdf), which is hereby incorporated by reference in its entirety along with all of the documents referenced on pages 11 to 14 of the SyRS report. The inter-vehicle communication systems may be installed on vehicles and along roadsides on infrastructure. The inter-vehicle communication systems incorporated into infrastructure (e.g., traffic signals, street lights, municipal cameras, etc.) is known as a "roadside" system or unit. inter-vehicle communication may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. inter-vehicle communication systems can be integrated with other systems such as mobile phones.

In some examples, the communication module 114 implements the Dedicated Short Range Communication (DSRC) protocol. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.). Additionally or alternatively, the communication module 114 implements one or more other communication protocols, such as Long Term Evolution (LTE), 5G communication, etc.

Further, the vehicle 100 includes a lighting controller 116 that monitors operability of lamps near the vehicle 100. For example, the lighting controller 116 identifies an object (e.g., a vehicle, a stationary infrastructure object) within image(s) captured via one or more of the cameras 102. For example, the lighting controller 116 utilizes image recognition software to identify object(s) located within images captured via the cameras 102. In some examples, the image recognition software identifies boundaries of objects within an image. Further, the image recognition software identifies an object within an image by comparing the identified boundary that corresponds to the object with a database (e.g., a database 916 of FIG. 9) including entries that correlate object boundaries to known objects. That is, the lighting controller 116 identifies an object within an image, via the image recognition software, by identifying boundaries within an image and comparing those boundaries to boundaries of known objects. Further, in some examples, the lighting controller 116 utilizes machine learning to perform image recognition of object(s) located within image(s) captured by one or more of the cameras 102 of the vehicle 100. Additionally or alternatively, the lighting controller 116 further identifies and/or detects the presence of the object based on data collected from one or more of the proximity sensors 106 (e.g., lidar sensors). For example, the lighting controller 116 utilizes the data collected from the proximity sensors 106 to identify a shape and/or a relative location of the object.

The lighting controller 116 also determines whether the identified object includes a lamp (e.g., an external lamp of vehicle, a lamp of a stationary infrastructure object) via, for example, the image recognition software. In response to determining that the object includes a lamp, the lighting controller 116 of the vehicle 100 identifies an operability of the lamp. For example, to determine whether the lamp is operable or inoperable, the lighting controller 116 monitors a light emission of the lamp based upon collected light emission measurement(s). For example, the light emission measurement and/or illumination measurements include color temperature measurements, relative intensity measurements, time series (e.g., blinking) measurements, etc. In some examples, the lighting controller 116 collects light emission measurement(s) of the lamp from the image(s) captured by one or more of the cameras 102. Additionally or alternatively, one or more of the light sensors 104 collect the light emission measurement(s) of the lamp. Further, in some examples, the lighting controller 116 monitors the light emission of the lamp by utilizing light frequency filtering to process a light profile of the lamp. For example, the lighting controller 116 applies light frequency filtering techniques to the captured image(s) and/or the collected data to determine the light profile of the lamp.

Further, in some examples, the lighting controller 116 determines whether the lamp of the identified object is operable, partially inoperable, and/or fully inoperable. For example, some lamps are formed from a plurality of light emitting diodes (LEDs). In such examples, the lamp emits more light when more of the LEDs of the lamp are inoperable. That is, a light emission characteristic of the lamp corresponds to the number of LEDs that are operable. The lighting controller 116 is configured to identify the inoperability, partial operability, and/or full operability of the lamp by comparing light emission measurements of the lamp to known thresholds corresponding to the lamp. In some examples, upon identifying the object, the lighting controller 116 controller identifies one or more thresholds that correspond to the operability of LEDs of a lamp of the object. For example, the lighting controller 116 identifies an upper threshold and a lower threshold of a lamp of an identified object. In response to determining that light emission measurement is greater than the upper threshold, the lighting controller 116 determines that the lamp is fully operable. That is, the lighting controller 116 determines that none of the LEDs of the lamp are inoperable. In response to determining that light emission measurement is between the lower threshold and the upper threshold, the lighting controller 116 determines that the lamp is partially operable. That is, the lighting controller 116 determines that some of the LEDs of the lamp are inoperable. Further, in response to determining that light emission measurement is less than the lower threshold, the lighting controller 116 determines that the lamp is inoperable. That is, the lighting controller 116 determines that none of the LEDs of the lamp are operable.

Additionally, the lighting controller 116 is configured to send an alert, via the communication module 114, an alert to indicate that the lamp of the identified object is (partially or fully) inoperable. For example, the lighting controller 116 sends the alert to a nearby infrastructure communication node via V2I communication and/or to a nearby vehicle via V2V communication. In some examples, the alert emitted by the lighting controller 116 identifies a location of the inoperable lamp and/or a location of the vehicle 100 at which one or more of the cameras 102 captured the image(s) that included the object. In some examples, the infrastructure communication node and/or the vehicle communication node relay the alert to a remote server (e.g., a cloud server) via a network (e.g., a cellular network). For example, the lighting controller 116 identifies the location of the inoperable lamp of the object by determining a location of the vehicle 100 via the GPS receiver 110 and determining a location of the object relative to the vehicle 100 via the collected image(s) and/or data. The lighting controller 116 includes the location of the vehicle 100 and/or the identified object in the alert to facilitate servicing and/or replacement of the inoperable lamp. Further, in some examples, the lighting controller 116 sends, via the communication module 112, the alert to a server (e.g., a server 918 of FIG. 9) via a cellular and/or other network (e.g., a network 920 of FIG. 9). For example, the remote server (e.g., a cloud server) stores the information of the inoperable lamp identified by the lighting controller 116 of the vehicle 100 to facilitate servicing and/or replacement of the inoperable lamp (e.g., by a third party).

Figure 2:
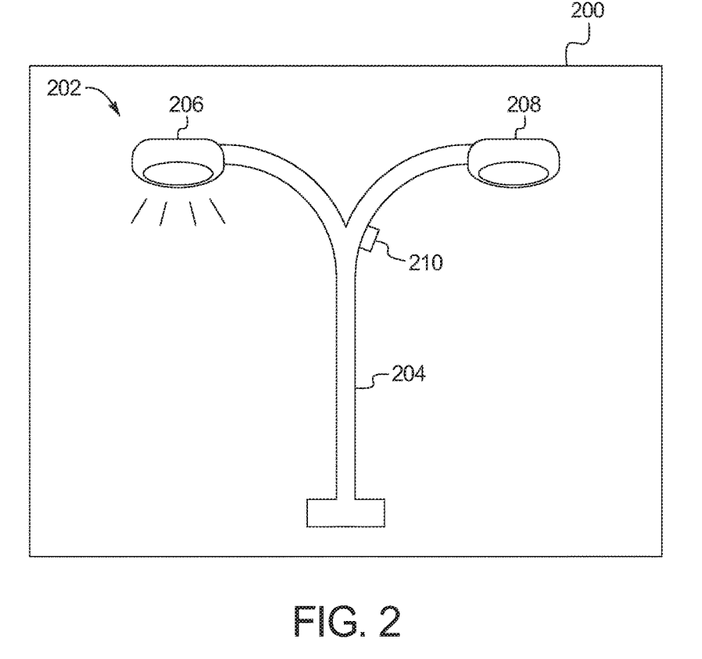
FIG. 2 depicts an example image of a lamppost captured by a camera of the vehicle of FIG. 1.

FIG. 2 depicts an example image 200 of a lamppost 202 that is captured by one or more of the cameras 102 of the vehicle 100. The lighting controller 116 of the vehicle 100 identifies that a stationary infrastructure object is within the image 200 and determines that the stationary infrastructure object is a lamppost via, for example, an image recognition system.

As illustrated in FIG. 2, the lamppost 202 includes a post 204, a streetlamp 206 (e.g., a first streetlamp), and another streetlamp 208 (e.g., a second lamp). For example, the streetlamp 206 and/or the streetlamp 208 are configured to illuminate a portion of a road (e.g., a road 302 of FIG. 3) along which the vehicle 100 is traveling. In other examples, the lamppost 202 includes more or less streetlamps.

The lighting controller 116 is configured to identify an operability of the streetlamps 206, 208 of the lamppost 202 based upon light emission measurements corresponding to the lamppost 202. For example, when the vehicle 100 is near the lamppost 202, one or more of the cameras 102 and/or one or more of the light sensors 104 collects a light emission measurement near the lamppost 202. In some examples, the lighting controller 116 is configured to monitor for light emission measurements of the lamppost 202 and/or other lampposts in response to one or more of the cameras 102 and/one or more of the light sensors 104 detecting that an ambient light surrounding the vehicle 100 is below an ambient light threshold associated with dark driving conditions in which streetlamps are activated. Further, the lighting controller 116 compares the light emission measurement to light emission threshold(s) corresponding to the lamppost 202. For example, the lighting controller 116 determines that the streetlamps 206, 208 are fully operable if the light emission measurement is greater than a first threshold; one of the streetlamps 206, 208 is partially inoperable if the light emission measurement is less than the first threshold; both of the streetlamps 206, 208 are partially inoperable if the light emission measurement is less than a second threshold; one of the streetlamps 206, 208 is fully inoperable if the light emission measurement is less than a third threshold; and/or both of the streetlamps 206, 208 are fully inoperable if the light emission measurement is less than a fourth threshold.

Additionally or alternatively, the lighting controller 116 is configured to compare light emission measurements of a plurality of streetlamps when a lamppost includes more than one streetlamp. For example, upon the lighting controller 116 determining that the lamppost 202 includes the streetlamp 206 and the streetlamp 208, the lighting controller 116 utilizes image recognition to compare a light emission of the streetlamp 206 (e.g., a first light emission) to a light emission of the streetlamp 208 (e.g., a second light emission) to identify an operability of the streetlamp 206 and the streetlamp 208. In the illustrated example, the lighting controller 116 determines that the streetlamp 206 is operable and the streetlamp 208 is inoperable in response to the lighting controller 116 determining, via image recognition, that the light emitted by the streetlamp 206 is greater than the light emitted by the streetlamp 208.

Upon detecting that the streetlamp 208 is inoperable, the lighting controller 116 emits an alert to facilitate servicing and/or replacement of the streetlamp 208. For example, the lighting controller 116 sends the alert to an infrastructure node 210 of lamppost 202 via the communication module 114. Additionally or alternatively, the infrastructure node 210 and/or the communication module 112 of the vehicle 100 sends the alert to a remote server (e.g., via a cellular network) to alert a third party that the streetlamp 208 is inoperable and in a state for servicing and/or replacement.

Figure 3:
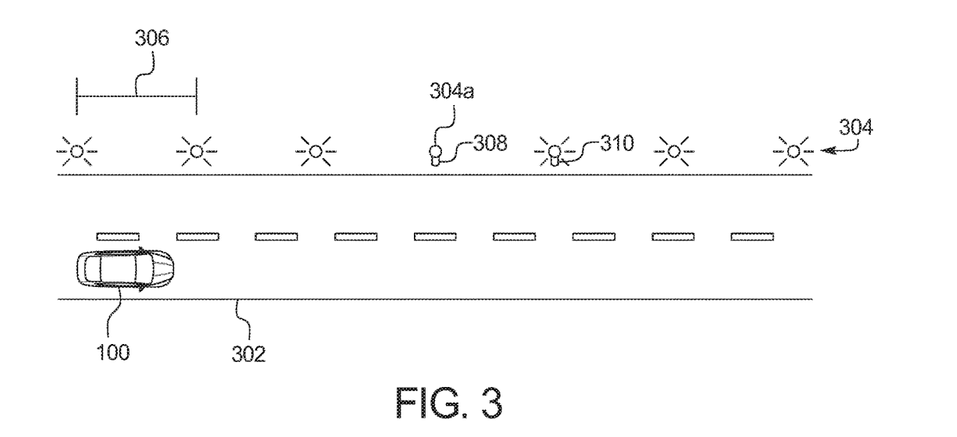
FIG. 3 illustrates the vehicle of FIG. 1 traveling along a road adjacent to a plurality of lampposts.

FIG. 3 illustrates the vehicle 100 traveling along a road 302 adjacent to a plurality of lampposts 304 that include streetlamps. As illustrated in FIG. 3, the lampposts 304 are spaced apart from each other by a distance 306. In the illustrated example, the lighting controller 116 identifies a pattern along which the lampposts 304 are positioned along the road. For example, the lighting controller 116 identifies the pattern based upon a plurality of images captured by one or more of the cameras 102, data collected by one or more of the light sensors 104, and/or data collected by one or more of the proximity sensors 106. Further, the lighting controller 116 determines (e.g., utilizing machine learning) a pattern of illumination that corresponds to the lampposts 304. For example, the lighting controller 116 determines the pattern of illumination based on illumination measurements collected via one or more of the cameras 102 and/or one or more of the light sensors 104. The lighting controller 116 identifies that a streetlamp of one of the lampposts 304 is inoperable in response to determining that an illumination measurement corresponding to that one of the lampposts 304 does not correspond to the pattern of illumination. That is, the lighting controller 116 determines that a streetlamp of one of the lampposts 304 is inoperable when that an illumination measurement corresponding to that one of the lampposts 304 is less than the illumination measurements of other of the lampposts 304 that are nearby. In the illustrated example, the lighting controller 116 identifies that a streetlamp of a lamppost 304a is inoperable upon detecting that the illumination measurement corresponding to the lamppost 304a does not correspond to the pattern of illumination formed by the lampposts 304 along the road 302.

Upon detecting that the streetlamp of the lamppost 304a is inoperable, the lighting controller 116 emits an alert to facilitate servicing and/or replacement of the streetlamp 208. For example, the lighting controller 116 sends the alert to an infrastructure node 308 of lamppost 304a and/or an infrastructure node 310 of another one of the lampposts 304 that is nearby. In some examples, the lighting controller 116 sends the alert to the infrastructure node 310 when the lamppost 304a that includes the inoperable lamp does not include an infrastructure node. Additionally or alternatively, the infrastructure node 308, the infrastructure node 310, and/or the communication module 112 of the vehicle 100 sends the alert to a remote server (e.g., via a cellular network) to alert a third party that the streetlamp is inoperable and in a state for servicing and/or replacement.

Figure 4:
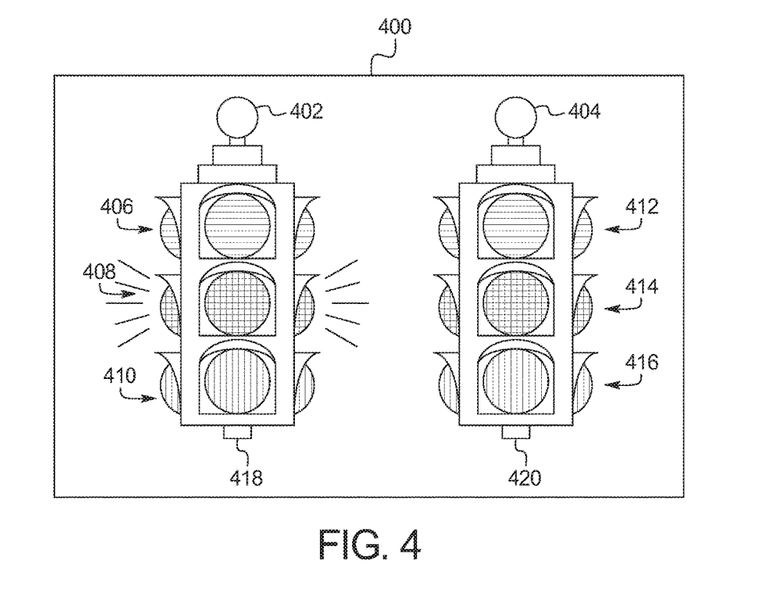
FIG. 4 depicts an example image of two traffic lights captured by a camera of the vehicle of FIG. 1.

FIG. 4 depicts an example image 400 of a traffic light 402 (e.g., a first traffic light) and another traffic light 404 (e.g., a second traffic light) that are located at an intersection. For example, the image 400 is captured by one or more of the cameras 102 of the vehicle 100 as the vehicle 100 approaches the intersection. The lighting controller 116 identifies that the stationary infrastructure objects are within the image 400 and determines that the stationary infrastructure objects are traffic lights via, for example, an image recognition system.

As illustrated in FIG. 4, the traffic light 402 includes a lamp 406 (e.g., a first lamp, a green lamp) that illuminates to instruct traffic to proceed, a lamp 408 (e.g., a second lamp, a yellow lamp) that illuminates to instruct traffic to yield, and a lamp 410 (e.g., a third lamp, a red lamp) that illuminates to instruct traffic to stop. Additionally, the traffic light 404 includes a lamp 412 (e.g., a first lamp, a green lamp) that illuminates to instruct traffic to proceed, a lamp 414 (e.g., a second lamp, a yellow lamp) that illuminates to instruct traffic to yield, and a lamp 416 (e.g., a third lamp, a red lamp) that illuminates to instruct traffic to stop. Further, the traffic lights 402, 404 of the intersection are configured to operate in unison. That is, the lamp 406 and the lamp 412 are configured to illuminate and deactivate in unison, the lamp 408 and the lamp 414 are configured to illuminate and deactivate in unison, and the lamp 410 and the lamp 416 are configured to illuminate and deactivate in unison.

In operation, the lighting controller 116 of the vehicle 100 is configured to identify, via image recognition, that an intersection includes the traffic light 402 and the traffic light 404 as the vehicle 100 approaches the intersection. Upon identifying the traffic lights 402, 404, the lighting controller 116 determines operability of the lamps 406, 408, 410 of the traffic light 402 and operability of the lamps 412, 414, 416 of the traffic light 404 by comparing light emissions of the traffic light 402 and the traffic light 404. In the illustrated example, the lighting controller 116 determines that the lamp 414 of the traffic light 404 is inoperable in response to detecting that the lamp 408 of the traffic light 402 is illuminated and the lamp 414 of the traffic light 404 is deactivated.

Upon detecting that one or more of the lamps 406, 408, 410, 412, 414, 416 of the traffic lights 402, 404 is inoperable, the lighting controller 116 emits an alert to facilitate servicing and/or replacement of one or more of the lamps 406, 408, 410, 412, 414, 416. For example, the lighting controller 116 sends the alert to an infrastructure node 418 of the traffic light 402 and/or an infrastructure node 420 of the traffic light 404 upon detecting that one or more of the lamps 406, 408, 410, 412, 414, 416 is inoperable. Additionally or alternatively, the infrastructure node 418, the infrastructure node 420, and/or the communication module 112 of the vehicle 100 sends the alert to a remote server (e.g., via a cellular network) to alert a third party that the streetlamp is inoperable and in a state for servicing and/or replacement.

Figure 5A:
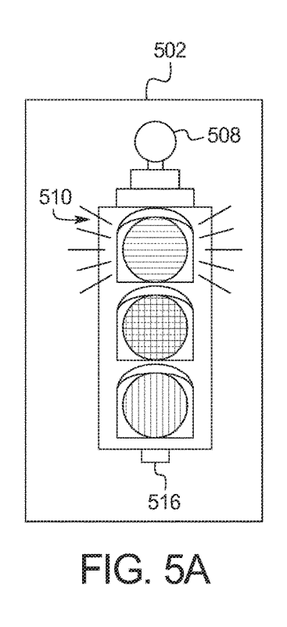
FIGS. 5A-5C depict an example sequence of images of a traffic light captured by a camera of the vehicle of FIG. 1.
Figure 5B:
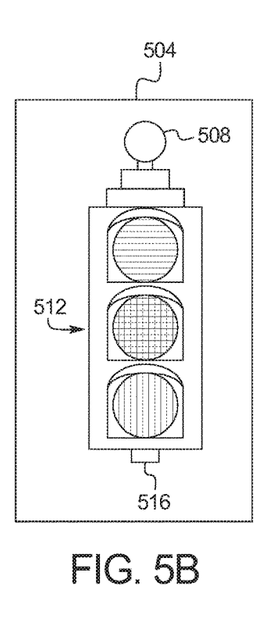
Figure 5C:
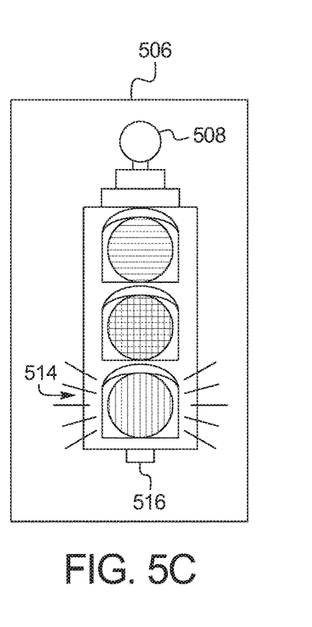

FIGS. 5A-5C depict an example sequence of images 502, 504, 506 of a traffic light 508 that is captured by one or more of the cameras 102 of the vehicle 100. More specifically, FIG. 5A illustrates the traffic light 508 in a first state, FIG. 5B illustrates the traffic light 508 in a second state, and FIG. 5C illustrates the traffic light 508 in a third state. As illustrated in FIGS. 5A-5C, the traffic light 508 includes a lamp 510 (e.g., a first lamp, a green lamp) that illuminates to instruct traffic to proceed, a lamp 512 (e.g., a second lamp, a yellow lamp) that illuminates to instruct traffic to yield, and a lamp 514 (e.g., a third lamp, a red lamp) that illuminates to instruct traffic to stop.

In the illustrated example, the images 502, 504, 506 are captured sequentially over a short period of time such that the image 502 is captured before the image 504 and the image 504 is captured before the image 506. In the first state of the traffic light 508 that is captured in the image 502 of FIG. 5A, the lamp 510 is illuminated and the lamps 512, 514 are deactivated. In the second state of the traffic light 508 that is captured in the image 504 of FIG. 5B, the lamps 510, 512, 514 are deactivated. In the third state of the traffic light 508 that is captured in the image 506 of FIG. 5C, the lamp 514 is illuminated and the lamps 510, 512 are deactivated. Based on the images 502, 504, 506, the lighting controller 116 determines a measured illumination sequence (e.g., a time-varying sequence) for the traffic light 508. For example, the lighting controller 116 determines that the measured illumination sequence includes a first state in which the lamp 510 is illuminated, a subsequent second state in which none of the lamps 510, 512, 514 are illuminated, and a subsequent third state in which the lamp 514 is illuminated.

Further, the lighting controller 116 retrieves a known illumination pattern (e.g., a time-varying pattern) for the lamps 510, 512, 514 of the traffic light 508. For example, the lighting controller 116 retrieves the known illumination pattern from a database (e.g., a database 916 of FIG. 9) of the vehicle 100 and/or a remote server (e.g., a cloud server) via the communication module 112. The lighting controller 116 identifies that one of the lamps 510, 512, 514 is inoperable in response to determining that the measured illumination sequence of the traffic lamps does not correspond with the known illumination pattern of the traffic light 508. For example, the lighting controller 116 identifies that one of the lamps 510, 512, 514 is inoperable upon comparing the traffic light 508, as captured in the image 504, to the known illumination pattern of the traffic light 508. Further, the lighting controller 116 is configured to identify which of the lamps 510, 512, 514 is inoperable by comparing two or more of the states of the measured illumination sequence to the known illumination pattern. For example, the lighting controller 116 identifies that the lamp 512 is inoperable upon comparing the images 502, 504 and/or the images 504, 506 to the known illumination pattern of the traffic light 508.

Upon detecting that one or more of the lamps 510, 512, 514 of the traffic light 508 is inoperable, the lighting controller 116 emits an alert to facilitate servicing and/or replacement of one or more of the lamps 510, 512, 514. For example, the lighting controller 116 sends the alert to an infrastructure node 516 of the traffic light 508 upon detecting that one or more of the lamps 510, 512, 514 is inoperable. Additionally or alternatively, the infrastructure node 516 and/or the communication module 112 of the vehicle 100 sends the alert to a remote server (e.g., via a cellular network) to alert a third party that the streetlamp is inoperable and in a state for servicing and/or replacement.

Further, in some examples, For example, the lighting controller 116 is configured to identify whether road markings (e.g., lane markings, reflective infrastructure elements, etc.) are in need of servicing. For example, the lighting controller 116 utilizes image recognition is utilized to detect a presence of and identify the road markings. Further, the lighting controller 116 utilizes the cameras 102 (e.g., in conjunction with image recognition software) and/or the proximity sensors 106 (e.g., lidar sensors) to measure the reflectivity of the road markings. If the reflectivity measurement is less than a corresponding threshold, the lighting controller 116 emits an alert to facilitate servicing of the road markings.

Figure 6:
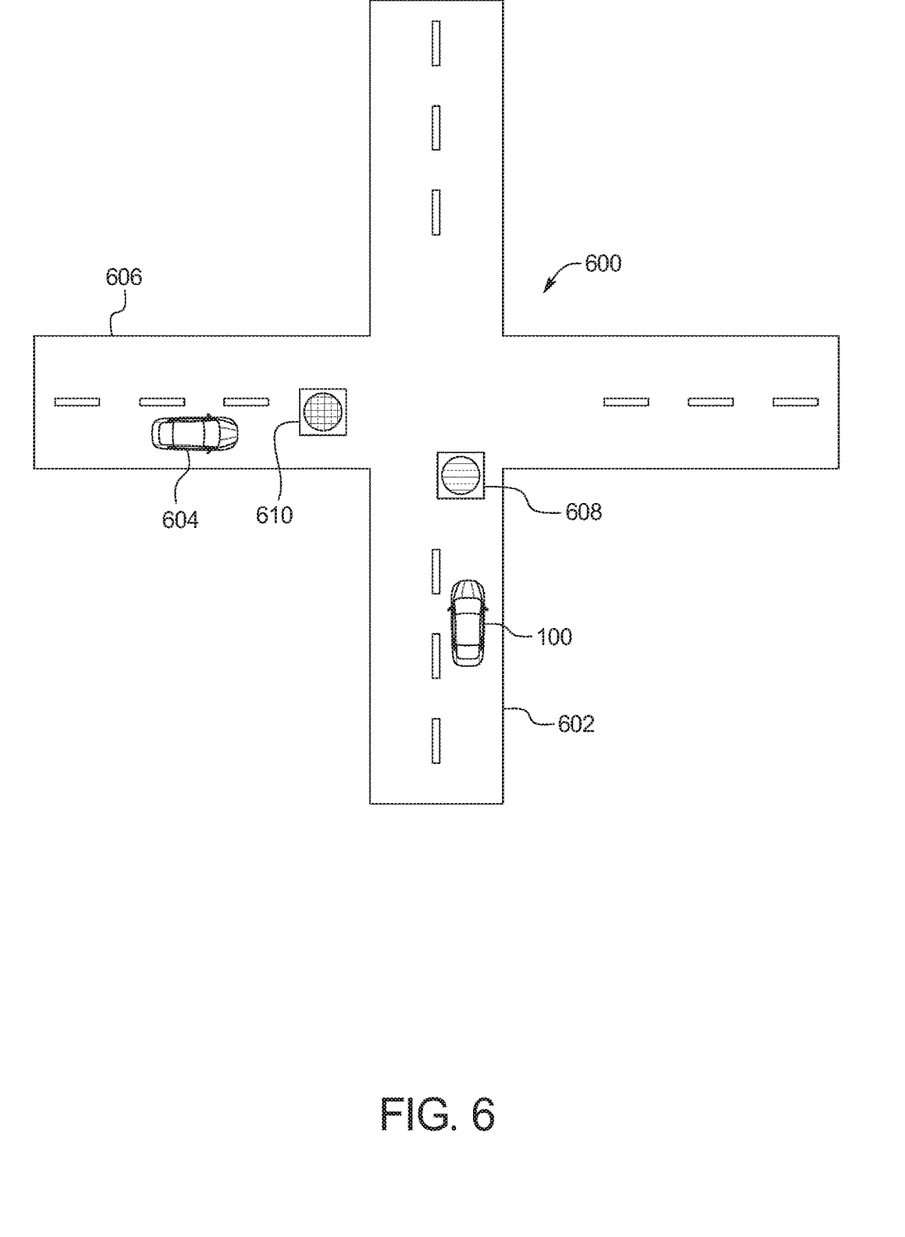
FIG. 6 illustrates the vehicle of FIG. 1 approaching an intersection.

FIG. 6 illustrates the vehicle 100 approaching an intersection 600. In the illustrated example, the intersection 600 is formed by a road 602 along which the vehicle 100 is travelling and a road 604 along which along which another vehicle 606 is travelling. Further, the vehicle 100 is approaching a flashing lamp 608 (e.g., a flashing red lamp) that instructs traffic to stop, and the vehicle 606 is approaching another flashing lamp 610 (e.g., a yellow flashing lamp) that instructs traffic to yield. In some instances, the operator of the vehicle 100 potentially may be unaware that the flashing lamp 610 is instructing the vehicle 606 to yield and/or may assume that the flashing lamp 610 is instructing the vehicle 606 to stop.

To facilitate the operator in safely driving the vehicle 100 through the intersection 600, the lighting controller 116 obtains additional information regarding the intersection 600 (e.g., that the flashing lamp 610 is instructing the vehicle 606 to yield) and presents the additional information to the operator (e.g., via an infotainment head unit 904 of FIG. 4). For example, the lighting controller 116 retrieves the additional information from a remote server (e.g., a cloud server) via the communication module 112. In some such examples, the remote server receives the additional information from vehicles (e.g., the vehicle 100, the vehicle 606) that travel through the intersection 600. Additionally or alternatively, the lighting controller 116 retrieves the additional information from the vehicle 606 via V2V communication, the flashing lamp 608 via V2I communication, and/or the flashing lamp 610 via V2I communication.

Figure 7:
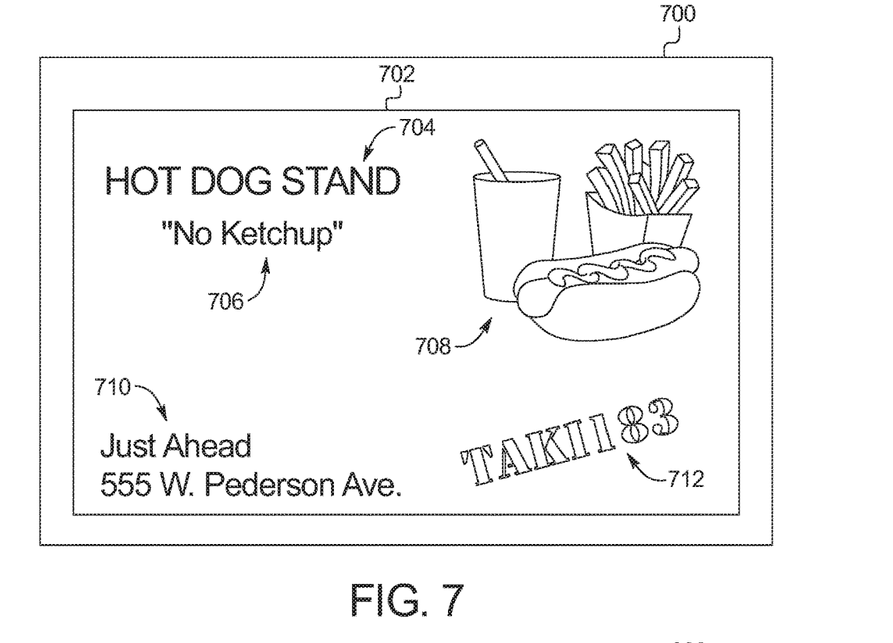
FIG. 7 depicts an example image of a commercial sign captured by a camera of the vehicle of FIG. 1.

FIG. 7 depicts an example image 700 of a commercial sign 702 that is captured by one or more of the cameras 102 of the vehicle 100. The commercial sign 702 includes a name 704, a slogan 706, a logo 708, and an address 710. In the illustrated example, the commercial sign 702, the name 704, the slogan 706, the logo 708, and/or the address 710 is illuminated by lamp(s) of the commercial sign 702.

The lighting controller 116 of the vehicle 100 is configured to identify an operability of the lamp(s) of the commercial sign 702 based upon light emission measurements corresponding to the commercial sign 702. For example, one or more of the cameras 102 and/or one or more of the light sensors 104 collects a light emission measurement when the vehicle 100 is near the commercial sign 702. Further, the lighting controller 116 compares the light emission measurement to light emission threshold(s) corresponding to the commercial sign 702. For example, the lighting controller 116 determines that the lamps of the commercial sign 702 are fully operable if the light emission measurement is greater than a first threshold, partially inoperable if the light emission measurement is between the first threshold and a second threshold, and fully inoperable if the light emission measurement is less than the second threshold. Additionally or alternatively, the lighting controller 116 utilizes image recognition to identify when one or more of the lamps of the commercial sign 702 is inoperable. Further, the lighting controller 116 is configured to utilize image recognition and/or machine learning to identify graffiti 712 on the commercial sign 702.

Upon detecting that the commercial sign 702 includes an inoperable lamp and/or graffiti, the lighting controller 116 emits an alert to facilitate servicing and/or replacement of the commercial sign 702. For example, the lighting controller 116 is configured to send an alert to an infrastructure node of commercial sign 702 via the communication module 114. Additionally or alternatively, the lighting controller 116 is configured to send an alert, via the communication module 112, to a remote server (e.g., via a cellular network) to alert a third party that the commercial sign 702 requires servicing.

The lighting controller 116 also may utilize image recognition software to identify information presented by the commercial sign 702 based on the images captured via the cameras 102. For example, the lighting controller 116 utilizes image recognition to identify the name 704, the slogan 706, the logo 708, and/or the address 710 that corresponds to the commercial sign 702. Further, in some examples, the lighting controller 116 detects when a new business has opened and/or an old business has closed and provides, via the communication module 112 and/or the communication module 114, such information to a remote server to be utilized for online business and/or map searches. Additionally or alternatively, the lighting controller 116 detects when a business has opened and/or closed for the day based upon detected light changes of a store front of the business and provides, via the communication module 112 and/or the communication module 114, such information to a remote server.

Figure 8:
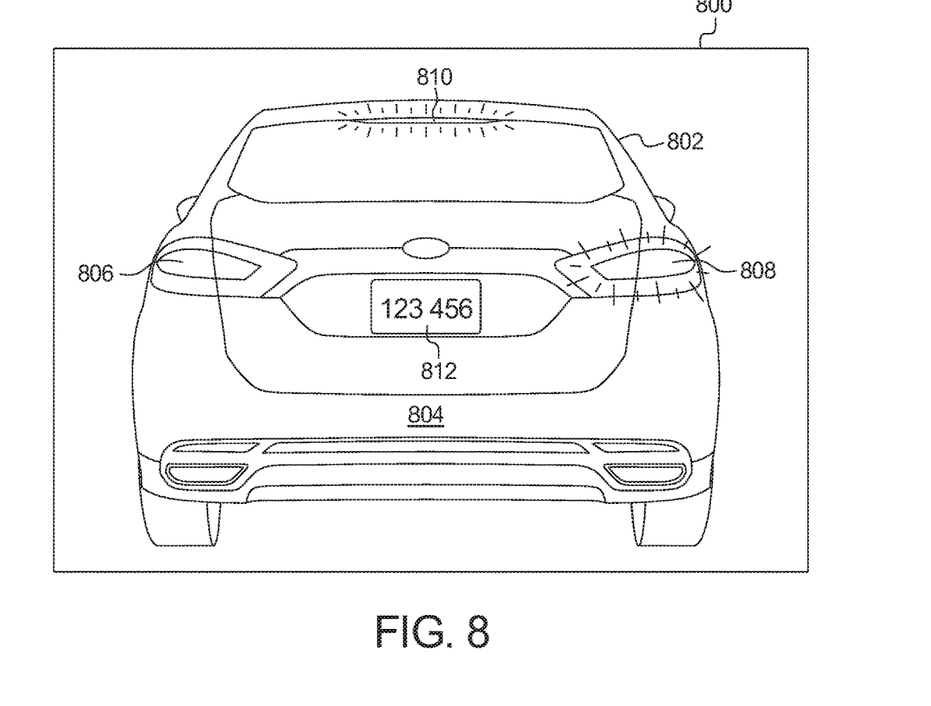
FIG. 8 depicts an example image of another vehicle captured by a camera of the vehicle of FIG. 1.

FIG. 8 depicts an example image 800 of another vehicle 802 that is captured by one or more of the cameras 102 of the vehicle 100. More specifically, the image 800 depicts a rear side 804 of the vehicle 802 that is located in front of the vehicle 100. As illustrated in FIG. 8, the rear side 804 of the vehicle 802 includes a brake lamp 806 (e.g., a first brake lamp, a left brake lamp), a brake lamp 808 (e.g., a second brake lamp, a right brake lamp), a brake lamp 810 (e.g., a third brake lamp, an upper brake lamp), and a license plate 812.

The lighting controller 116 of the vehicle 100 is configured to identify an operability of the brake lamps 806, 808, 810 of the vehicle 802 in front of the vehicle 100. Additionally or alternatively, the lighting controller 116 is configured to identify an operability of brake lamps of vehicle(s) behind and/or to the side of the vehicle 100. For example, the lighting controller 116 the lighting controller 116 is configured to monitor the operability of the brake lamps 806, 808, 810 of the vehicle 802 upon identifying that the vehicle 802 is braking. In some examples, the lighting controller 116 identifies that the vehicle 802 is braking based upon V2V communication that is received from the vehicle 802 via the communication module 114 of the vehicle 100. Further, in some examples, the lighting controller 116 identifies that the vehicle 802 is braking, reversing, changing lanes, etc. based upon data collected from sensors of the vehicle 100, such as one or more of the proximity sensors 106, a vehicle speed sensor, an accelerometer, etc.

Upon detecting that the vehicle 802 is braking, the lighting controller 116 applies image recognition to the image 800 to monitor the operability of the brake lamps 806, 808, 810 of the vehicle 802. For example, the lighting controller 116 utilizes image recognition to identify locations of the brake lamps 806, 808, 810 and to determine light emission measurements of each of the brake lamps 806, 808, 810. Subsequently, the lighting controller 116 compares the light emission measurements to determine whether one or more of the brake lamps 806, 808, 810 is inoperable. In the illustrated example, the lighting controller 116 determines that the light emission measurement corresponding to the brake lamp 806 is less than the light emission measurement of the brake lamp 808 and the light emission measurement of the brake lamp 810. In response, the lighting controller 116 determines that the brake lamps 808, 810 are illuminated and the brake lamp 806 is deactivated. Because the lighting controller 116 detects that the brake lamp 806 is deactivated when the vehicle 802 is braking, the lighting controller 116 determines that brake lamp 806 is inoperable.

Upon detecting that one or more of the brake lamps 806, 808, 810 is inoperable, the lighting controller 116 emits an alert. For example, the lighting controller 116 utilizes the communication module 114 to send an alert to the vehicle 802 via V2V communication. Additionally or alternatively, the lighting controller 116 utilizes the communication module 112 to send an alert to a remote server (e.g., via a cellular network). For example, the alert includes an identification of the vehicle 802 that is detected to have an inoperable brake lamp and/or other external lamp based upon the license plate 812. In some such examples, the lighting controller 116 utilizes image recognition to identify the license plate 812 within the image 800. Further, while the illustrated example includes monitoring the brake lamps 806, 808, 810 of the vehicle 802, the lighting controller 116 of the vehicle 100 may be utilized to monitor any other external lighting of the vehicle 802 (e.g., day-time running lights).

Figure 9:
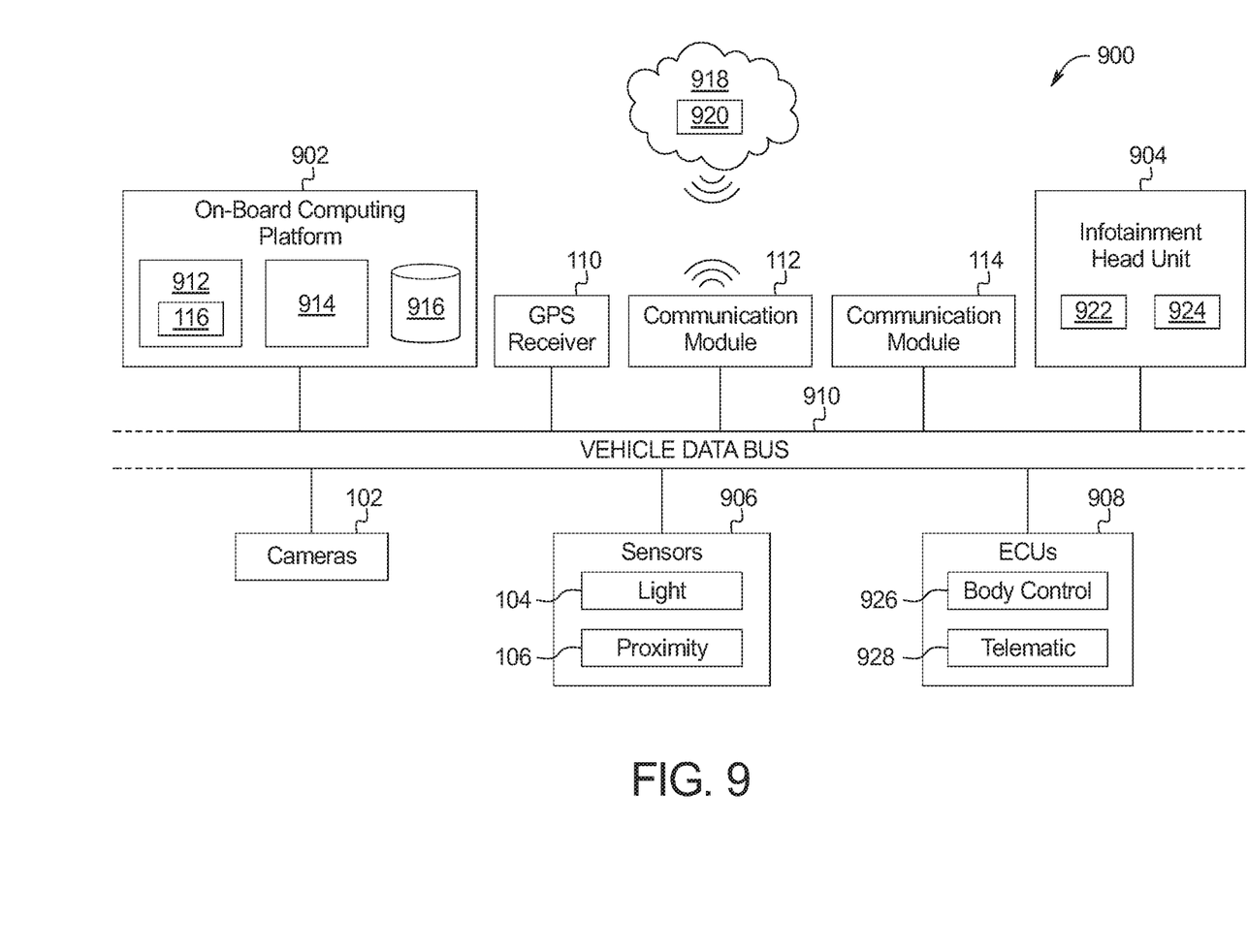
FIG. 9 is a block diagram of electronic components of the vehicle of FIG. 1.

FIG. 9 is a block diagram of electronic components 900 of the vehicle 100. As illustrated in FIG. 9, the electronic components 900 include an on-board computing platform 902, the GPS receiver 110, the communication module 112, the communication module 114, an infotainment head unit 904, the cameras 102, sensors 906, electronic control units (ECUs) 908, and a vehicle data bus 910.

The on-board computing platform 902 includes a microcontroller unit, controller or processor 912; memory 914; and a database 916. In some examples, the processor 912 of the on-board computing platform 902 is structured to include lighting controller 116. Alternatively, in some examples, the lighting controller 116 is incorporated into another electronic control unit (ECU) with its own processor 912, memory 914, and/or database 916. The database 916 stores, for example, entries that correlate characteristics of objects within images captured by the cameras 102 of the vehicle 100 to characteristics of known objects. For example, the lighting controller 116 retrieves boundaries of objects within images, lamppost patterns, illumination patterns of traffic lights, geographic information, and/or other information and compares the retrieved information to data collected by the cameras 102 and/or the sensors 0906 of the vehicle 100 to identify and monitor illumination of detected objects.

The processor 912 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 914 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 914 includes multiple kinds of memory, particularly volatile memory and non-volatile memory.

The database 916 stores, for example, entries that correlate known objects (e.g., lampposts, streetlamps, traffic lights, traffic lamps, commercial signs, lamps of commercial signs, vehicles, vehicle lamps, operable lamps, inoperable lamps, graffiti, etc.) to object(s) included in image(s) and/or video captured by one or more of the cameras 102 of the vehicle 100. For example, the lighting controller 116 accesses one or more entries of the database 916 to identify object(s) within the captured image(s) and/or video as a lamppost, an operable streetlamp, an inoperable streetlamp, a traffic light, an operable traffic lamp, an inoperable traffic lamp, a commercial sign, an operable lamp of a commercial sign, an inoperable lamp of a commercial sign, graffiti, a vehicle, an operable lamp of a vehicle, an inoperable lamp of a vehicle, etc.

The memory 914 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 914, the computer readable medium, and/or within the processor 912 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Further, as illustrated in FIG. 9, the electronic components 900 include the GPS receiver 110, the communication module 112, and the communication module 114. For example, the communication module 112 wirelessly communicates with a server 918 of a network 920. For example, the communication module 112 sends captured images and/or information identifying detected inoperable infrastructure lamps (e.g., locations of detected inoperable infrastructure lamps, identification of which infrastructure lamps are detected as inoperable), detected graffiti (e.g., locations of detected graffiti), and/or detected inoperable lamps of vehicles (e.g., license plates of vehicles with inoperable lamps, identification of which infrastructure lamps are detected as inoperable) to the server 918 via a cellular network to enable others to identify and address inoperable lamps, graffiti, etc.

The infotainment head unit 904 of the illustrated example provides an interface between the vehicle 100 and a user. The infotainment head unit 904 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display 922 (e.g., a heads-up display, a center console display such as a liquid crystal display (LCD), an organic light emitting diode (OLED) display, a flat panel display, a solid state display, etc.), and/or speakers 924. In the illustrated example, the infotainment head unit 904 includes hardware (e.g., a processor or controller, memory, storage, etc.) and software (e.g., an operating system, etc.) for an infotainment system (such as SYNC® and MyFord Touch®). Further, the infotainment head unit 904 displays the infotainment system on, for example, the display 922. Additionally or alternatively, the display 922, the speakers 924 and/or other output device(s) of the infotainment head unit 904 present information that is collected from the server 918 of the network 920 via the communication module 112 and/or from infrastructure node(s) and/or other vehicle(s) via the communication module 114 to facilitate an operator of the vehicle 100 in controlling the vehicle 100.

The sensors 906 are arranged in and around the vehicle 100 to monitor properties of the vehicle 100 and/or an environment in which the vehicle 100 is located. One or more of the sensors 906 may be mounted to measure properties around an exterior of the vehicle 100. Additionally or alternatively, one or more of the sensors 906 may be mounted inside a cabin of the vehicle 100 or in a body of the vehicle 100 (e.g., an engine compartment, wheel wells, etc.) to measure properties in an interior of the vehicle 100. For example, the sensors 906 include accelerometers, odometers, tachometers, pitch and yaw sensors, wheel speed sensors, microphones, tire pressure sensors, biometric sensors and/or sensors of any other suitable type. In the illustrated example, the sensors 906 include the light sensors 104 and the proximity sensors 106.

The ECUs 908 monitor and control the subsystems of the vehicle 100. For example, the ECUs 908 are discrete sets of electronics that include their own circuit(s) (e.g., integrated circuits, microprocessors, memory, storage, etc.) and firmware, sensors, actuators, and/or mounting hardware. The ECUs 908 communicate and exchange information via a vehicle data bus (e.g., the vehicle data bus 910). Additionally, the ECUs 908 may communicate properties (e.g., status of the ECUs 908, sensor readings, control state, error and diagnostic codes, etc.) to and/or receive requests from each other. For example, the vehicle 100 may have seventy or more of the ECUs 908 that are positioned in various locations around the vehicle 100 and are communicatively coupled by the vehicle data bus 910.

In the illustrated example, the ECUs 908 include a body control module 926 and a telematic control unit 928. For example, the body control module 926 controls one or more subsystems throughout the vehicle 100, such as power windows, power locks, an immobilizer system, power mirrors, etc. For example, the body control module 926 includes circuits that drive one or more of relays (e.g., to control wiper fluid, etc.), brushed direct current (DC) motors (e.g., to control power seats, power locks, power windows, wipers, etc.), stepper motors, LEDs, etc. The telematic control unit 928 controls tracking of the vehicle 100, for example, utilizing data received by the GPS receiver 110 of the vehicle 100.

The vehicle data bus 910 communicatively couples the cameras 102, the GPS receiver 110, the communication module 112, the communication module 114, the on-board computing platform 902, the infotainment head unit 904, the sensors 906, and the ECUs 908. In some examples, the vehicle data bus 910 includes one or more data buses. The vehicle data bus 910 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 10:
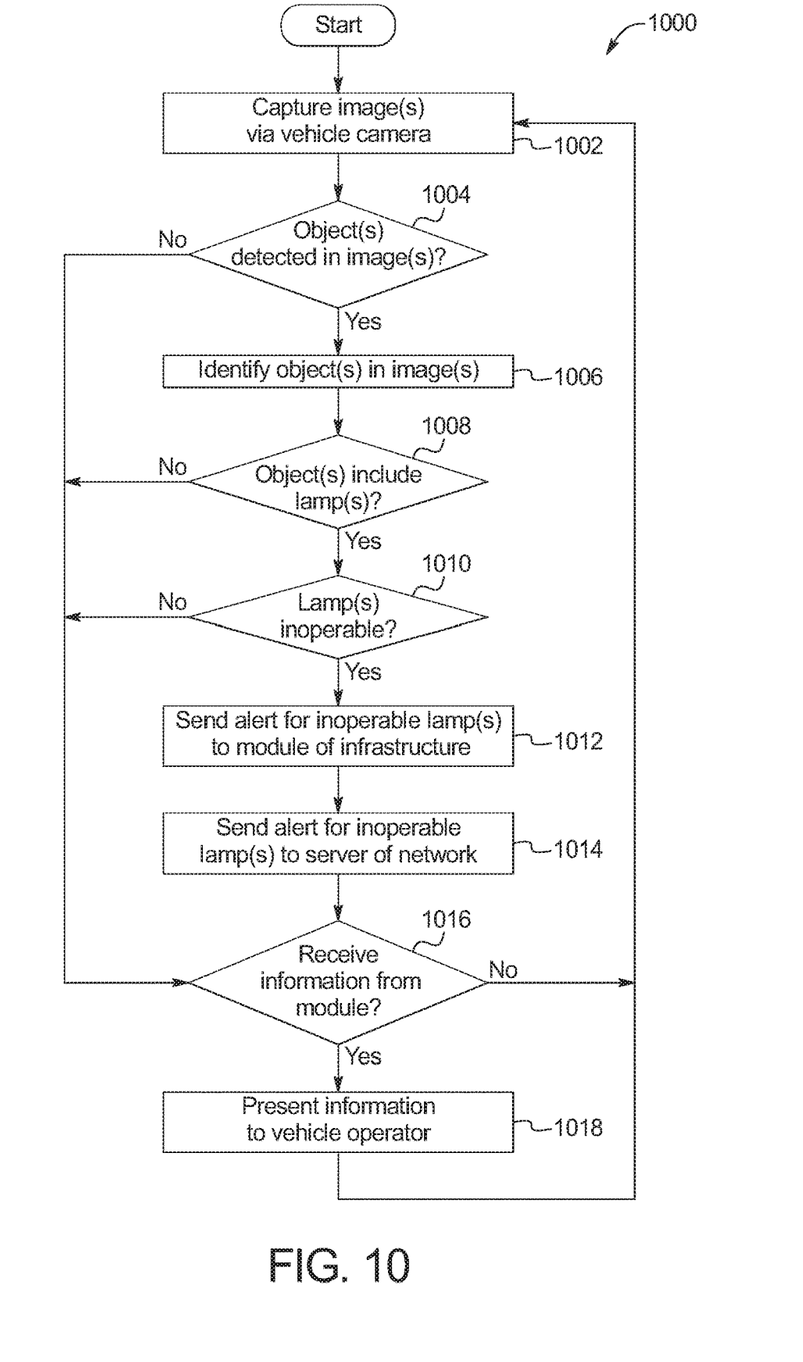
FIG. 10 is a flowchart for monitoring infrastructure lighting via a vehicle in accordance with the teachings herein.

FIG. 10 is a flowchart of an example method 1000 to monitor infrastructure lighting. The flowchart of FIG. 10 is representative of machine readable instructions that are stored in memory (such as the memory 914 of FIG. 9) and include one or more programs which, when executed by a processor (such as the processor 912 of FIG. 9), cause the vehicle 100 to implement the example lighting controller 116 of FIGS. 1 and 9. While the example program is described with reference to the flowchart illustrated in FIG. 9, many other methods of implementing the example lighting controller 116 may alternatively be used. For example, the order of execution of the blocks may be rearranged, changed, eliminated, and/or combined to perform the method 1000. Further, because the method 1000 is disclosed in connection with the components of FIGS. 1-9, some functions of those components will not be described in detail below.

Initially, at block 1002, one or more of the cameras 102 of the captures image(s) of a surrounding area of the vehicle 100. At block 1004, the lighting controller 116 determines whether object(s) are detected within the captured image(s). For example, the lighting controller 116 utilizes image recognition to detect object(s) (e.g., a stationary infrastructure object, a vehicle, etc.) within one or more of the captured image(s). In response to the lighting controller 116 detecting no object(s) within the captured image(s), the method 1000 proceeds to block 1016. Otherwise, in response to the lighting controller 116 detecting object(s) within the captured image(s), the method 1000 proceeds to block 1006.

At block 1006, the lighting controller 116 identifies the object(s) that are within the captured image(s). For example, the lighting controller 116 identifies an object by comparing characteristics of the captured image(s) to characteristics of known objects. In some examples, the lighting controller 116 performs the comparison upon retrieving the characteristics of the known objects from a database (e.g., the database 916 of the vehicle 100, a database of the server 918). In some examples, the lighting controller 116 identifies that the object(s) include stationary infrastructure object(s), such as lamppost(s), traffic light(s), commercial sign(s), etc. In other examples, the lighting controller 116 identifies that the object(s) include other vehicle(s).

At block 1008, the lighting controller 116 determines whether object(s) detected within the captured image(s) include lamp(s). For example, the lighting controller 116 determines that a detected object includes a lamp by utilizing image recognition and/or by retrieving such information from a database (e.g., the database 916 of the vehicle 100, a database of the server 918). In response to the lighting controller 116 determining that the detected object(s) do not include a lamp, the method 1000 proceeds to block 1016. Otherwise, in response to the lighting controller 116 determining that the detected object(s) include lamp(s), the method 1000 proceeds to block 1010.

At block 1010, the lighting controller 116 determines whether the lamp(s) of the object(s) are inoperable. For example, the lighting controller 116 determines an operability of the lamp(s) by applying image recognition to the captured image(s) and/or based upon light emission measurements. For example, the lighting controller 116 compares a collected light emission measurement to a light emission threshold to determine whether lamp(s) of a detected objected are operable. In response to the lighting controller 116 determining that none of the lamp(s) are inoperable, the method 1000 proceeds to block 1016. Otherwise, in response to the lighting controller 116 determining that one or more of the lamp(s) is inoperable, the method 1000 proceeds to block 1012. At block 1012, the lighting controller 116 utilizes the communication module 114 (i.e., an inter-vehicle communication module such as a DSRC module) to send an alert to an infrastructure node via V2I communication and/or to a communication node of another vehicle via V2V communication that identifies the inoperable lamp. At block 1014, the lighting controller 116 utilizes the communication module 112 to send an alert to a remote server of a network (e.g., the server 918 of the network 920).

At block 1016, the lighting controller 116 determines whether the communication module 114 and/or the communication module 112 has received information that facilitates an operator of the vehicle 100 in operating the vehicle 100. In some examples, the communication module 114 and/or the communication module 112 receives navigational information as the vehicle 100 approaches an intersection to facilitate the operator of the vehicle 100. In response to the lighting controller 116 determining that such information has not been received, the method 1000 returns to block 1002. Otherwise, in response to the lighting controller 116 determining that such information has been received, the method 1000 proceeds to block 1018 at which the lighting controller 116 presents such information to the operator of the vehicle 100 (e.g., via the infotainment head unit 904).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a camera;
   an inter-vehicle communication module; and
   a controller to:
   identify a stationary infrastructure object within an image captured by the camera;
   identify, in response to determining that the stationary infrastructure object includes a lamp, whether the lamp is inoperable; and
   send, via vehicle-to-infrastructure communication utilizing the inter-vehicle communication module, an alert to an infrastructure communication node indicating that the lamp is inoperable.

2. The vehicle of claim 1, further including a proximity sensor to further detect a presence of the stationary infrastructure object.

3. The vehicle of claim 1, wherein, to identify the stationary infrastructure object and operability of the lamp, the controller utilizes machine learning to perform image recognition.

4. The vehicle of claim 1, wherein the controller monitors a light emission of the lamp to determine whether the lamp is inoperable.

5. The vehicle of claim 4, further including a light sensor configured to collect light emission measurements to enable the controller to monitor the light emission of the lamp.

6. The vehicle of claim 4, wherein, to monitor the light emission of the lamp, the controller utilizes light frequency filtering to process a light profile of the lamp.

7. The vehicle of claim 4, wherein the controller determines that the lamp is inoperable in response to determining, based upon the light emission of the lamp, that one or more LEDs of the lamp is inoperable.

8. The vehicle of claim 1, further including:
   a second communication module configured to send the alert to a server via a cellular network; and
   a GPS receiver configured to identify a vehicle location, wherein the controller includes the vehicle location, at which the camera captured the image that included the stationary infrastructure object, in the alert to facilitate identification of a location of the lamp that is inoperable.

9. The vehicle of claim 1, wherein the controller identifies that the stationary infrastructure object is a lamppost, the lamp of the lamppost being a first streetlamp configured to illuminate a portion of a road.

10. The vehicle of claim 9, further including a light sensor to monitor an ambient light, wherein the controller is configured to identify an operability of the first streetlamp in response to the light sensor detecting that the ambient light is below an ambient light threshold.

11. The vehicle of claim 9, wherein, upon the controller identifying that the lamppost includes the first streetlamp and a second streetlamp, the controller determines an operability of the first streetlamp by comparing light emissions of the first streetlamp and the second streetlamp.

12. The vehicle of claim 9, wherein the controller is configured to:
identify a pattern of lampposts along the road based upon a plurality images captured by the camera;
determine a pattern of illumination corresponding to the pattern of lampposts; and
identify that the first streetlamp of the lamppost is inoperable in response to determining an illumination measurement of the lamppost does not correspond to the pattern of illumination.

13. The vehicle of claim 1, wherein the controller identifies that the stationary infrastructure object is a first traffic light that includes traffic lamps, each of the traffic lamps includes a first lamp for instructing traffic to proceed, a second lamp for instructing the traffic to yield, and a third lamp for instructing the traffic to stop.

14. The vehicle of claim 13, wherein, upon the controller identifying that an intersection includes the first traffic light and a second traffic light, the controller determines an operability of one or more of the traffic lamps of the first traffic light by comparing light emissions of the first traffic light and the second traffic light.

15. The vehicle of claim 13, wherein the controller is configured to:
retrieve an illumination pattern of the traffic lamps; and
identify one of the traffic lamps as inoperable in response to determining that a measured illumination sequence of the traffic lamps does not correspond with the illumination pattern.

16. The vehicle of claim 1, wherein the controller identifies that the stationary infrastructure object is a commercial sign.

17. A method comprising:
identifying, via a processor, an infrastructure object within an image captured by a camera of a vehicle;
determining whether the infrastructure object includes a lamp;
identifying, in response to determining the infrastructure object includes the lamp, whether the lamp is inoperable; and
sending, via vehicle-to-infrastructure communication utilizing an inter-vehicle communication module of the vehicle, an alert to an infrastructure communication node indicating that the lamp is inoperable.

18. The method of claim 17, further including:
identifying a pattern of lampposts along a road based upon a plurality of images captured by the camera, one of the lampposts being the infrastructure object;
determining a pattern of illumination corresponding to the pattern of the lampposts; and
identifying that the lamp of the infrastructure object is inoperable in response to determining that an illumination measurement for the infrastructure object does not correspond to the pattern of illumination.

19. The method of claim 17, further including:
identifying, based upon the image captured by the camera, an intersection that includes a first traffic light and a second traffic light, the first traffic light being the infrastructure object; and
determining an operability of the lamp of the first traffic light by comparing light emissions of the first traffic light and the second traffic light.

20. The method of claim 17, further including
identifying that the infrastructure object is a traffic light;
retrieving an illumination pattern of traffic lamps of the traffic light; and
identifying that one of the traffic lamps is inoperable in response to determining that a measured illumination sequence of the traffic lamps does not correspond with the illumination pattern.

* * * * *